US009687876B2

(12) United States Patent
Werner

(10) Patent No.: US 9,687,876 B2
(45) Date of Patent: Jun. 27, 2017

(54) METHOD OF REPAIRING AND/OR PROTECTING A SURFACE IN A REACTOR

(71) Applicant: Hemlock Semiconductor Corporation, Hemlock, MI (US)

(72) Inventor: Brad Jason Werner, Bay City, MI (US)

(73) Assignee: HEMLOCK SEMICONDUCTOR CORPORATION, Hemlock, MI (US)

( * ) Notice: Subject to any disclaimer, the term of this patent is extended or adjusted under 35 U.S.C. 154(b) by 123 days.

(21) Appl. No.: 14/375,579

(22) PCT Filed: Jan. 28, 2013

(86) PCT No.: PCT/US2013/023412
§ 371 (c)(1),
(2) Date: Jul. 30, 2014

(87) PCT Pub. No.: WO2013/116146
PCT Pub. Date: Aug. 8, 2013

(65) Prior Publication Data
US 2015/0017335 A1    Jan. 15, 2015

Related U.S. Application Data

(60) Provisional application No. 61/592,037, filed on Jan. 30, 2012.

(51) Int. Cl.
| | | |
|---|---|---|
| B05D 5/00 | (2006.01) | |
| B01J 19/02 | (2006.01) | |
| B05D 7/22 | (2006.01) | |
| B05D 7/00 | (2006.01) | |
| C09D 183/00 | (2006.01) | |
| C09D 183/16 | (2006.01) | |
| B05D 3/02 | (2006.01) | |
| B05D 3/04 | (2006.01) | |

(52) U.S. Cl.
CPC ............... *B05D 5/00* (2013.01); *B01J 19/02* (2013.01); *B05D 3/0209* (2013.01); *B05D 3/0254* (2013.01); *B05D 7/22* (2013.01); *B05D 7/52* (2013.01); *C09D 183/00* (2013.01); *C09D 183/16* (2013.01); *B01J 2219/00024* (2013.01); *B01J 2219/00272* (2013.01); *B01J 2219/0236* (2013.01); *B05D 3/0272* (2013.01); *B05D 3/0486* (2013.01); *B05D 5/005* (2013.01); *B05D 2518/10* (2013.01); *B05D 2518/12* (2013.01)

(58) Field of Classification Search
None
See application file for complete search history.

(56) References Cited

U.S. PATENT DOCUMENTS

| | | | |
|---|---|---|---|
| 5,126,112 A | 6/1992 | Burgie | |
| 5,422,088 A | 6/1995 | Burgie et al. | |
| 5,582,861 A | 12/1996 | Schwab et al. | |
| 5,906,799 A * | 5/1999 | Burgie ..................... | B01J 19/02 422/241 |
| 7,033,561 B2 | 4/2006 | Kendig et al. | |
| 7,080,742 B2 | 7/2006 | Arvidson et al. | |
| 7,442,824 B2 | 10/2008 | Paetzold et al. | |
| 7,628,878 B2 | 12/2009 | Riedell et al. | |
| 7,888,277 B2 | 2/2011 | Riedell et al. | |
| 7,927,984 B2 | 4/2011 | Molnar | |
| 7,935,327 B2 | 5/2011 | Arvidson et al. | |
| 2004/0173597 A1 | 9/2004 | Agrawal et al. | |
| 2010/0266466 A1 | 10/2010 | Froehlich et al. | |

FOREIGN PATENT DOCUMENTS

| | | |
|---|---|---|
| CN | 1554802 A * | 12/2004 |
| CN | 101636524 A | 1/2010 |
| DE | 4317905 A1 | 12/1993 |
| JP | 11130552 A | 5/1999 |

OTHER PUBLICATIONS

Caplus and wpix abstracts of CN1554802 A, Dec. 2004.*
Machine translation of CN 1554802 A, Dec. 2004.*
Translation of JP 11-130552, May 1999.*
Kolaya et al, Ceramic Engineering and Science Proceedings, 18(4), pp. 473-480, 1997.*
(Human) translation of CN 1554802, Dec. 2004.*
Japanese Patent No. 11130552; Date of Publication: May 18, 1999; Abstract Only, 2 pages.
German Patent No. 4317905; Date of Publication: Dec. 2, 1993; Abstract Only, 2 pages.
International Search Report for International Application No. PCT/US2013/023412; Date of Mailing: Jun. 7, 2013; 3 pages.
Ming Luo et al., "Oxidation resistance of multi-walled carbon nanotubes coated with polycarbosilane-derived SiCxOy ceramic" Ceramics International 37 (2011) 3055-3062; 8 pages.
Chinese Patent No. 101636524; Date of Publication: Jan. 27, 2010; Abstract Only, 1 Page.

(Continued)

*Primary Examiner* — Erma Cameron
(74) *Attorney, Agent, or Firm* — Cantor Colburn LLP

(57) ABSTRACT

A method of forming a heterogeneous protective layer on a surface of a component in a reactor is useful for repair and/or protection. The reactor may be used for production of polycrystalline silicon or a reactant thereof. The heterogeneous protective layer comprises silicon, and may comprise silicon carbide (SiC) and/or silicon nitride ($Si_3N_4$). The method comprises providing a polymeric composition for forming the heterogeneous protective layer. The polymeric composition may comprise a polycarbosilane and/or a polysilazane. The method further comprises providing the component. The surface of the component comprises carbon, such as graphite, carbon fiber reinforced carbon, or a combination thereof. The method further comprises applying the polymeric composition on the surface to form a pre-cured coating layer. The method further comprises heating the pre-cured coating layer to form the heterogeneous protective layer. The surface of the component is present within the reactor during heating of the pre-cured coating layer.

20 Claims, No Drawings

(56) References Cited

OTHER PUBLICATIONS

Written Opinion of the International Searching Authority for International Application No. PCT/US2013/023412; Date of Mailing: Aug. 14, 2014; 8 pages.
Berbon et al., "Transverse Thermal Conductivity of Thin C/SiC Composites Fabricated by Slurry Infiltration and Pyrolysis", Journal of the American Ceramic Society, 2001, vol. 84, Issue 10, pp. 2229-2234.

* cited by examiner

METHOD OF REPAIRING AND/OR PROTECTING A SURFACE IN A REACTOR

CROSS REFERENCE TO RELATED APPLICATIONS

This application claims the benefit of U.S. Provisional Patent Application Ser. No. 61/592,037, filed on Jan. 30, 2012, which is incorporated herewith by reference in its entirety. This application also claims the benefit of PCT Patent Application No. PCT/US13/23412, filed on Jan. 28, 2013, which is incorporated herewith by reference in its entirety.

TECHNICAL FIELD

The present invention generally relates to a method of repairing and/or protecting a surface in a reactor, and specifically to a method of forming a heterogeneous protective layer on a surface of a component in a reactor with the heterogeneous protective layer comprising silicon.

BACKGROUND

Conventional reactors can be used to form a variety of products, such as polycrystalline silicon. To facilitate production of such products, the reactors often include one or more components with surfaces, such as baffles, which interact with process gases used to form the products. Unfortunately, these surfaces are degraded by the process gases (and/or process byproducts) over time, especially when the surfaces include carbon. As such, these surfaces are typically coated with a protective layer prior to placement within the reactor. For example, chemical vapor deposition (CVD) may be used to form a layer of silicon carbide (SiC) on the surface of the component, which may also be referred to as a CVD-SiC layer. Such CVD processes are utilized separate from the reactor itself, e.g. offsite.

Unfortunately, components including CVD-SiC layers are expensive. In addition, the components can be awkward and/or heavy, making shipping, handling, and installing them into reactors dangerous and time consuming, which further raises the costs associated with them. Further, the CVD-SiC layer may be imperfect or damaged during manufacture, handling, or use of the component. As such, the underlying surface, albeit thought to be fully protected, can still be attacked by the process gases, such as through a mere pinhole in the CVD-SiC layer. Over time, the component becomes unusable or eventually fails due to degradation. The component must then be removed from the reactor and either repaired offsite, or more typically, scrapped altogether. In view of the foregoing, there remains an opportunity to provide a method of forming a heterogeneous protective layer on a surface of a component in a reactor.

SUMMARY OF THE INVENTION

The present invention provides a method of forming a heterogeneous protective layer on a surface of a component in a reactor. The heterogeneous protective layer comprises silicon. The method comprises providing a polymeric composition for forming the heterogeneous protective layer. The method further comprises providing the component. The surface of the component comprises carbon. The method further comprises applying the polymeric composition on the surface of the component to form a pre-cured coating layer. The method further comprises heating the pre-cured coating layer to form the heterogeneous protective layer. The surface of the component is present within the reactor during heating of the pre-cured coating layer.

DETAILED DESCRIPTION OF THE INVENTION

The present invention provides a method of forming a heterogeneous protective layer on a surface of a component in a reactor. The method is useful for repairing and/or protecting the surface. For example, the method can be used to repair a previously degraded surface. Alternatively, or in addition to, the method can be used to prevent such degradation from occurring or from further occurring. Alternatively, or in addition to, the method can be used to form new articles within the reactor. Further aspects and benefits of the invention method are described below.

The heterogeneous protective layer comprises silicon (Si). By "heterogeneous", it is generally meant that the heterogeneous protective layer includes one or more elements in addition to Si, such as carbon and/or nitrogen. Said another way, the heterogeneous protective layer can comprise silicon carbide (SiC), silicon nitride ($Si_3N_4$), or a combination/hybrid thereof. Such layers are different from a "homogenous" layer, such as a layer consisting essentially of Si, e.g. a layer consisting of polycrystalline Si. Homogenous layers may contain more than one element, but only in trace amounts, e.g. in instances of contamination.

The surface can be a surface of the reactor itself, such as a chamber surface (e.g. an inner wall, floor, cover, ceiling, etc.). Said another way, the component can be an inner portion of the reactor. The surface can also be a surface of an auxiliary component of the reactor, such as a baffle, a separator, an insulator, a heater, an interchanger, etc. Such components may be fixed or movably disposed within the reactor. The surface can also be a combination of these or other surfaces generally associated with reactor innards. As such, the surface can be substantially planar or non-planar, and can include corners, valleys, edges, etc. In certain embodiments, the surface is associated with the separator, the heater, the interchanger, or combinations thereof. The component may also be referred to herein as the reactor component.

Typically, the surface comprises carbon. For example, the surface can comprise a carbon alloy, such as carbon steel. The surface may also comprise graphite, such as iso-graphite. The surface may also comprise carbon fiber reinforced carbon (CFRC), which can also be referred to in the art as carbon fiber composite (CFC) or carbon fiber reinforced polymer (CFRP). In other embodiments, the surface comprises a ceramic matrix composite (CMC), and in further embodiments, the surface comprises a carbon fiber matrix composite (CFMC). The surface may also comprise a combination of the aforementioned materials. These carbon based surfaces are often used in reactors and/or for reactor components due to their strength/rigidity and ability to handle high temperatures and/or pressures commonly encountered within reactors. In these embodiments, carbon is often present in a majority amount.

Unfortunately, such surfaces are susceptible to physical and/or chemical degradation, such as attack by oxidizing liquids or gases, e.g. hydrochloric acid (HCl), or physical wear and tear, over time. This is especially true at the temperatures and/or pressures typically associated with reactors. Over time, such surfaces slowly degrade until potentially failing outright. As such, such degraded surfaces often require costly preventative maintenance, repair, or replacement.

To alleviate some of these problems, the surfaces are often coated with a preformed protective layer (or a number of protective layers). The preformed protective layer typically comprises Si, such as SiC, $Si_3N_4$, or a combination thereof. The preformed protective layer serves to protect the surface (or a base layer) from degradation. As such, the surface can comprise the preformed protective layer(s), e.g. SiC, disposed on or over the base layer, e.g. graphite. However, the preformed protective layer is often susceptible to degradation itself, albeit at a rate generally slower than that of the base layer. As such, the preformed protective layer will eventually require repair or replacement. If the preformed protective layer degrades to failure, e.g. pits or cracks, the base layer will be susceptible to degradation.

If such degradation goes unchecked, it can lead to contamination of the product(s) made in the reactor, such as carbon leaching out of the base layer into the product(s). In addition, degradation of the base layer may go unappreciated as it is shielded from view by the preformed protective layer. For example, a pinhole in the preformed protective layer may lead to extensive damage to the base layer which is not recognized until the preformed protective layer itself collapses due to lack of underlying support.

As used herein, reference to the surface may refer the base layer alone, the preformed protective layer alone, or a combination of the base layer and the preformed protective layer. By "preformed", it is generally meant that the protective layer is one formed previously via the invention method and/or by a third-party, such as by a reactor or component manufacturer/supplier. For example, the component may be provided by a third-party who utilized a conventional chemical vapor deposition (CVD) process to form the preformed protective layer, e.g. a CVD-SiC layer. Alternatively, the component may include the preformed protective layer which was first formed via the invention method. For example, a component with a "virgin" surface can be protected via the method. Alternatively, the preformed protective layer can be one that was formed via a combination of a third-party method and the invention method, such as when the method was previously used for repairing or supplementing the third-party's CVD-SiC layer.

While the method can be used for various types of reactors, the method has been found to be especially useful for reactors used in the production of Si, especially in the production of polycrystalline Si, and/or reactants thereof. Those skilled in the art understand that polycrystalline silicon generally comprises the reaction product of trichlorosilane and hydrogen gas ($H_2$). Trichlorosilane itself generally comprises the reaction product of silicon tetrachloride and $H_2$. As such, the method can be used for reactors which are used to form polycrystalline silicon and for reactors used to form trichlorosilane.

Further examples of suitable reactors, reactor components, and reactor conditions (e.g. temperatures and pressures), are described in U.S. Pat. No. 5,126,112 to Burgie; U.S. Pat. No. 5,422,088 to Burgie et al.; U.S. Pat. No. 5,906,799 to Burgie et al.; U.S. Pat. No. 7,033,561 to Kendig et al.; U.S. Pat. No. 7,080,742 to Arvidson et al.; U.S. Pat. No. 7,442,824 to Paetzold et al.; U.S. Pat. No. 7,927,984 to Molnar; U.S. Pat. No. 7,935,327 to Arvidson et al.; and US Pat. Pub. No. 2004/0173597 to Argawal et al.; the disclosures of which are incorporated herein by reference in their entirety to the extent they do not conflict with the general scope of the present invention. It is to be appreciated that the method may be used with a combination of different types of reactors and/or components thereof. The invention method will now be described.

A polymeric composition is provided for forming the heterogeneous protective layer. The polymeric composition (or composition), can also be referred to in the art as a pre-ceramic polymeric composition, pre-ceramic polymer, pre-ceramic resin, or ceramic forming polymer. The composition can be in various forms, such as a liquid, slurry, putty, semi-solid, etc.

In various embodiments, the composition comprises a polycarbosilane. The polycarbosilane can be of various types. In certain embodiments, the polycarbosilane is allylhydridopolycarbosilane. The allylhydridopolycarbosilane can be of various types. These embodiments are useful for forming the heterogeneous protective layer when it comprises SiC, consists essentially of SiC, or consists of SiC.

In other embodiments, the composition comprises a polysilazane. The polysilazane can be of various types. In certain embodiments, the polysilazane is perhydropolysilazane. The perhydropolysilazane can be of various types. These embodiments are useful for forming the heterogeneous protective layer when it comprises $Si_3N_4$, consists essentially of $Si_3N_4$, or consists of $Si_3N_4$.

In further embodiments, the composition can include a combination of one or more polycarbosilanes and/or polysilazanes. In certain embodiments, the polysilazane is a polyureasilazane. These embodiments are useful for forming hybrid heterogeneous protective layers of SiC and/or $Si_3N_4$.

Without being bound or limited by any particular theory, it is believed that utilizing the polycarbosilane is better suited for certain reactors based on its chemical backbone and its byproducts formed during densification, which is described further below. That is not to say that the polysilazane is not also suitable for other types of reactors based on its chemical backbone. For example, certain reactors (or reactor environments) may better benefit from a SiC protective layer, whereas others may better benefit from a $Si_3N_4$ protective layer. Determining which type of protective layer is best for a particular type of reactor (or reactor environment) can be determined via routine experimentation or general knowledge in the art.

The composition can further comprise one or more additional components, such as a solvent, a filler, a catalyst (or free-radical initiator), etc. Examples of solvents include hexane, tetrahydrofuran, toluene, and combinations thereof; however, other solvents may also be used. Typically, if utilized, the solvent is a non-polar solvent. The solvent is useful for adjusting viscosity of the composition. Examples of fillers include refractive fillers; however, other fillers may also be used. Examples of catalysts include metal catalysts (e.g. platinum) and peroxides; however, other catalysts may also be used. The catalyst is useful for adjusting cure of the composition.

Further examples of suitable compositions are commercially available from a variety of suppliers, such as ceramic forming polymers from Starfire Systems, Inc. of Schenectady, N.Y., under the trade name STARFIRE™. Specific examples of suitable ceramic forming polymers include STARFIRE™ SL-454WC, STARFIRE™ SL-MS10, STARFIRE™ SL-MS32b, STARFIRE™ SL-MS20, STARFIRE™ SL-MS42b, STARFIRE™ SL-MS30, STARFIRE™ SL-MS50b, STARFIRE™ SMP-MS58, STARFIRE™ SMP-730, STARFIRE™ SMP-10, and STARFIRE™ SMP-877.

In certain embodiments, the composition further comprises a filler. The filler can be useful for further forming the heterogeneous protective layer. The filler can also be useful as a thickener. The filler can be various fillers. In certain embodiments, the filler comprises silicon carbide, silicon nitride, or a combination thereof. As such, once the composition is densified to form the heterogeneous protective layer, the filler and polymeric portions can become indistinguishable based on similar chemical makeup. Alternatively, a hybrid heterogeneous protective layer can be formed, as introduced to above.

If utilized, the filler can be incorporated in various amounts. For example, the filler may be present in an amount of from about 1 to about 80, about 10 to about 80, about 20 to about 70, about 30 to about 60, or about 40 to about 50, parts by weight, each based on 100 parts by weight of the composition. In certain embodiments, the filler is present in an amount of from about 40 to about 80, or about 30 to about 50, parts by weight, each based on 100 parts by weight of the composition.

Further examples of suitable compositions, are described in U.S. Pat. No. 5,582,861 to Schwab et al.; U.S. Pat. No. 7,628,878 to Riedell et al.; U.S. Pat. No. 7,888,277 to Riedell et al.; and in Berbon, M., Dietrich, D., Marshall, D., Hasselman D. (October 2001). Transverse Thermal Conductivity of Thin C/SiC Composites Fabricated by Slurry Infiltration and Pyrolysis. *Journal of the American Ceramic Society*, Vol. 84, Issue 10, 2229-2234; the disclosures of which are incorporated herein by reference in their entirety to the extent they do not conflict with the general scope of the present invention. The inventive method may use a combination of different compositions.

The component is provided. As described above, the component may be one already having a preformed protective layer, e.g. a CVD-SiC layer, which is in need of repair or preventive maintenance. Alternatively, the component may be a new or "virgin" component, which does not yet have a protective layer. Such components are commercially available from a variety of suppliers, such as those available from Tokia Carbon USA of Hillsboro, Oreg., and from Mersen of Bay City, Mich.

The composition is applied to the surface to form a pre-cured coating layer. The pre-cured coating layer can also be referred to in the art as a nondensified, predensified, green, or wet, coating layer. The composition can be applied to the surface by various methods. For example, the composition can be applied to the surface by spraying, brushing, (putty) knifing, pouring, rolling, dipping, smearing, rubbing, wiping, or combinations thereof. In certain embodiments, the composition is brushed on and/or sprayed on.

In certain embodiments, as least a portion of the composition absorbs, infiltrates, or wicks, into the surface. Absorption of the composition into the surface can depend on the specific type of composition and/or type of surface. For example, a lower viscosity composition may be more apt to absorb into the surface, e.g. graphite. In these embodiments, the composition may physically and/or chemically interact with the surface. For example, the composition may physically "bite into" the surface by filling or latching on to pores and/or irregularities defined by the surface. In addition, the composition can chemically react with the surface, such as an instance where a silicon atom of the composition chemically reacts with a carbon atom of the surface. Such interactions can even occur at the atomic level, such as with the carbon atom structure of graphite. In certain instances, it is believed that the composition can wick into the graphite (as the surface). Such wicking can be to various depths into the surface, and is generally represented by a concentration gradient of composition which decreases as depth into the surface increases.

The surface of the component can be left in place, i.e., inside the reactor, or removed from the reactor for application of the composition. Typically, the surface of the component is present within the reactor during application of the composition. This is useful for components that are difficult to move or remove due to size, shape, location, etc. For example, the component can be left in place and the surface can be accessed through a reactor port for purposes of applying the composition.

The composition may be cut with solvent (or additional solvent, if already present) to ease application onto certain surfaces. For example, if sprayed, the composition can be thinned for ease of application. In addition, adjusting viscosity can also be useful to access difficult to reach surfaces, e.g. the composition can better flow into corners, cracks, pits, etc. Adjusting viscosity can also be utilized to adjust thickness of the pre-cured coating layer. For example, compositions with more body can be used to form thicker layers, whereas composition with less body can be used to form thinner layers. Thickness of the pre-cured coating layer may be uniform or may vary. In certain embodiments, a lower viscosity may provide for increased absorption of the composition into the surface.

As introduced above, the surface may either be a virgin surface or one which includes a preformed protective layer. If the latter, the preformed protective layer typically has one or more portions which require preventive maintenance, supplementation, or repair. For example, the preformed protective layer may have a defect such as a portion which has thinned out or defined a cavity, due to degradation or manufacturing errors. Examples of such defects include chips, cracks, pinholes, craters, pits, etc. Such defects may only be present on, or extend all the way through, the preformed protective layer. These defects may be quite small to quite large. For example, the defect may have a depth of from about 0.5 to about 5 mils. The defect(s) can be of various sizes, shapes, and locations. The invention method is not limited to any particular type of defect.

It is believed that even "new" components received from third-parties may have such defects, e.g. the new components are not 100% sealed with a CVD-SiC layer. The composition is typically applied such that the defect is at least partially, to completely, filled with the heterogeneous protective layer formed from the composition. Excess composition can also be applied to a surrounding area or the entire surface as a means of preventive maintenance. For example, some defects may not be detectable or appreciated (e.g. via the naked eye) at the time of application, but can be addressed nonetheless. Various amounts of the composition can be applied to the surface, depending on the desired configuration and amount of the heterogeneous protective layer. In addition, different types of the composition can be applied to different portions of the surface.

The same or different composition may be applied to the surface in successive steps to form successive layers of the pre-cured coating layer. Such layering can be used to build up thickness of the heterogeneous protective layer. For example, a first polymeric composition can be applied to the surface to form a first pre-cured layer. Next, a second polymeric composition can be applied to the first pre-cured layer to form a second pre-cured layer (either while the first pre-cured layer is still in a wet or a cured form). The second polymeric composition can be the same as or different from the first polymeric composition. This same methodology can be used for building up successive layers as well. The resulting layer(s) can be uniform of have strata lines (in a cross-section).

In one embodiment, the second polymeric composition comprises a filler and the first polymeric composition is free of the filler present in the second polymeric composition. As such, the first polymeric composition may be completely free of filler, or may just have filler different from that of the second polymeric composition.

If different from one another, it is to be appreciated that the compositions can be different in various ways. For example, the compositions may merely have different viscosities based on different amounts of solvent. In certain embodiments, it may be useful to first apply one (or more than one) thinner "primer" layers of the composition to the surface. It is believed that the primer layer is useful for substantially sealing the surface and/or assisting in adhesion of subsequent layers to the surface. Further, a portion of the composition may absorb into the surface and provide a better substrate for subsequent layers to adhere to. Next, one (or more than one) heavier "basecoat" layers are applied to the primer layer. The primer layer can be wet or cured prior to this application. It is believed that the basecoat layer is useful for building thickness and strength of the pre-cured coating layer(s). Optionally, one (or more than one) thinner "topcoat" layers can be applied to the basecoat layer(s). The basecoat layer can be wet or cured prior to this application. It is believed that the topcoat layer is useful for assisting in adhesion of the basecoat layer to the surface, sealing porosity in the basecoat layer (e.g. if pores are present), and sealing and strengthening the pre-cured coating layer. The primer layer is optional in certain embodiments.

Besides changing solvent amounts, the compositions can be different in other ways as well, such as having different chemistries, different types of filler, different amounts of filler, absence and presence of filler, etc. For example, it may be useful to first apply one (or more than one) primer layers which are free of filler to substantially seal the surface, followed by a one (or more than one) basecoat layers with varying amounts of filler to build thickness of the pre-cured coating layer. In these embodiments, the filler can serve as a thickener. As just one example, four different basecoat layers can each individually have about 20, about 40, about 60, and about 80, parts by weight filler, each based on 100 parts by weight of the respective basecoat layer. The amount and/or type of filler in each basecoat layer, application order thereof, and total number of basecoat layers, can be varied. Optionally, one (or more than one) topcoat layers free of filler can also be applied to the basecoat layer(s) to ensure complete protection of the surface. The primer layer is optional in certain embodiments.

The compositions are typically applied to the surface at a first temperature (T1). T1 may be the temperature of the composition, surface, and/or ambient environment. T1 may also be lower or higher than any of these temperatures. T1 is typically of from about 5 to about 40, about 10 to about 35, about 15 to about 30, about 20 to about 30, about 20 to about 25, or about 23° C.

The pre-cured coating layer is heated to form (e.g. cure/densify) the heterogeneous protective layer. The pre-cured coating layer can be heated by various means, such as by heating the reactor. Typically, the pre-cured coating layer is heated by feeding a gas composition into the reactor. As such, the gas composition heats the pre-cured coating layer and the innards of the reactor. The gas composition can comprise various gases. In certain embodiments, the gas composition comprises one or more gases which are typically used in the reactor to form products therein.

For example, the gas composition can comprise trichlorosilane, silicon tetrachloride, or a combination thereof. The gas composition may further comprise HCl and/or $H_2$. As introduced above, polycrystalline silicon generally comprises the reaction product of trichlorosilane and $H_2$. Further, trichlorosilane generally comprises the reaction product of silicon tetrachloride and $H_2$. As such, the pre-cured coating layer can be cured by one or more gases typically used while the reactor is producing polycrystalline silicon or trichlorosilane. Examples of such reactors are in the incorporated references introduced above, such as those used for hydrogenation of silicon tetrachloride and those used to form polycrystalline silicon, e.g. fluidized bed reactors (FBRs). Such reactors can include separators, heaters, interchangers, etc. as components. The heterogeneous protective layer is especially useful for preventing methanization and degradation of the base layer by the process gases associated with these types of reactors.

In certain embodiments, an inert environment is established in the reactor prior to heating of the pre-cured coating layer. The inert environment is generally established by feeding at least one inert gas into the reactor. The inert gas can be of various types, such as nitrogen gas ($N_2$). In these embodiments, the inert gas may also be used to heat the pre-cured coating layer much like the process gases described above.

As such, the pre-cured coating layer may be heated by various means associated with the reactor. Said another way, the surface is typically present within the reactor during heating of the pre-cured coating layer. For example, the pre-cured coating layer may be heated in situ during establishment of the inert environment with the inert gas. The pre-cured coating layer may be heated in situ during startup of the reactor via one or more process gases. The pre-cured coating layer may be heated in situ during production via one or more process (and/or effluent) gases. The pre-cured coating layer may also be heated by combination of these methods.

The inert and process gases can either be preheated and fed into the reactor, fed into the reactor and heated by the reactor (or a component of the reactor), or a combination thereof. If present in the composition, the solvent can be allowed to first evaporate/flash prior to heating, or evaporation can be expedited via application of heat.

If successive layers of the pre-cured coating layer are utilized, they can be cured after each application, can be cured collectively as a whole, or can be cured via a combination thereof. For example, the basecoat layer may be applied to the primer layer "wet on wet" and then cured. Next, the topcoat layer can be applied to the basecoat layer "wet on cured" and then cured itself. Various combinations of application and curing steps can used to form successive layers of the heterogeneous protective layer. The curing steps may also be referred to in the art as pyrolysis steps. It is to be appreciated that such successive layers may be indistinguishable in the final heterogeneous protective layer; however, successive layers may be appreciated if formed from different chemistries, fillers, etc. For example, strata may be visible in a cross-section of the protective layer.

The pre-cured coating layer is heated to a second temperature (T2) which is greater than T1 to cure (or densify) the coating layer and form the heterogeneous protective layer on the surface. T2 is typically of from about 100 to about 1750, about 200 to about 1600, about 400 to about 1600, about 600 to about 1600, about 600 to about 1500, about 650 to about 1400, about 700 to about 1400, about 800 to about 1400, or about 1000 to about 1400° C. In various embodiments, T2 is greater than about 600, greater than about 650, greater than about 700, greater than about 750, or greater than about 800° C. In these embodiments, T2 may have peak temperatures as described in the temperature ranges above, e.g. about 1750° C.

The pre-cured coating layer is heated for a period of time to facilitate cure/densification of the coating layer. The period of time can vary, and may be relatively short to relatively long. Typically, the period of time is of from about 1 minute to about 72 hours, or about 1 to about 48, about 6 to about 36, about 12 to about 30, about 18 to about 24, or about 24, hours. In certain in situ embodiments, sufficient cure for purposes of surface protection can be nearly instantaneous. Said another way, while it may take a longer period of time for the pre-cured coating layer to reach a final cure (or a fully densified) state to form the heterogeneous protective layer, even the slightest amount of cure can be sufficient to protect the surface in the interim. Alternatively, it is possible that the mere presence of the pre-cured coating layer on the surface (prior to curing) is sufficient in the interim for purposes of surface protection. The amount of time required to cure may also be influenced by conditions in the reactor such as temperature and pressure. For example, increased pressure may alter temperature and/or time requirements for reaching a final cure state.

Referring to curing of the composition from the pre-cured coating layer to the heterogeneous protective layer, it is believed that the composition (or compositions) goes through densification and pyrolysis phases. Specifically, with regard to heterogeneous protective layers comprising SiC, and without being bound or limited by any particular theory, it is believed that low weight oligomers (e.g. carbosilanes) evolve from the pre-cured layer at a temperature of from about room temperature (23±3° C.) to about 200° C. From about 250° C. to about 400° C., it believed that hydrogen atoms are eliminated from Si sites, resulting in evolution of $H_2$ from, and crosslinking of, the layer. From about 450° C. to about 550° C., it is believed that homolytic cleavage of C—H and Si—H bonds result in free-radicals and further evolution of $H_2$. Up to about 800° C., it is believed that C—H bonds persist and yet further evolution of $H_2$ occurs. Up to about 1000° C., it is believed that the layer comprises a ceramic structure having the structure: $SiCH_{\sim 0.3}$. Up to about 1200° C., it is believed that any remaining $H_2$ evolves from the layer. From about 1400° C. to about 1500° C., a weight loss generally occurs in the layer, which is believed to be evolution of silicon monoxide gas (SiO). At about 1600° C., it is believed that the layer fully crystallizes to a beta-SiC (β-SiC) form. As such, the heterogeneous protective layer comprises β-SiC after reaching these higher temperatures. It is believed that β-sic is especially useful for protecting the surface. In addition, the $H_2$ which evolves during cure can be useful as a supplemental reactant within the reactor, such as during a hydrogenation process.

The heterogeneous protective layer can be of various thicknesses. Typically, the heterogeneous protective layer has an average thickness greater than about 0.1 mils, or of from about 0.1 to about 10, about 0.5 to about 7.5, about 1 to about 7.5, about 2.5 to about 7.5, or about 5, mils. The thickness may be uniform or may vary. For example, a portion of the heterogeneous protective layer may be made thicker for extra protection, whereas another portion may be made thinner based on location. In certain embodiments, portions of the heterogeneous protective layer are thicker due to the profile of the surface, e.g. corners and/or valleys of the surface.

As alluded to above, the invention method provides various benefits. The method is useful for repairing surfaces associated with reactors. The method is also useful for protecting surfaces associated with reactors. The method is useful for extending life of reactors and/or components. It is easier to repair and/or salvage reactors and/or components. It is easier to prevent failure of reactors and/or components.

Better quality and/or consistency of products made in the reactor can be achieved, such as decreased amounts of impurities. Such impurities can arise from carbon leached from the reactor and/or components. There is a reduced amount of off specification ("off spec") products made in the reactor and reduced downtime of the reactor. There is reduced maintenance cost associated with the reactor. For example, the costs associated with the method, e.g. the composition, are relatively inexpensive relative to the replacement costs of the components themselves. In addition, the components can be difficult to handle, install, and remove, which adds cost.

Presence of the composition and/or the heterogeneous protective layer in the reactor does not negatively affect the reactor process, e.g. hydrogenation process. There are not any special or additional steps required to cure the pre-cured coating layer in an inert or controlled environment. For example, typical drying of the reactor innards via a $N_2$ purge followed by ramping up flow of the process gases into the reactor can be followed according to standard operating procedures, without separately accounting for presence of the composition. For example, as described above, the $H_2$ evolving during cure can be utilized in situ during a hydrogenation process in the reactor. Further specific embodiments of the invention method will now be described.

In one embodiment, the heterogeneous protective layer is formed on the surface of the component in the reactor. The heterogeneous protective layer comprises SiC, $Si_3N_4$, or a combination thereof. The composition comprises the polycarbosilane, the polysilazane, or a combination thereof. The surface of the component comprises graphite, CFRC, or combinations thereof. The composition is applied to the surface of the component to form the pre-cured coating layer. The gas composition is fed into the reactor thereby heating the pre-cured coating layer to form the heterogeneous protective layer. The gas composition comprises trichlorosilane, silicon tetrachloride, or a combination thereof. The gas composition may also comprise $H_2$. The inert environment may be established in the reactor prior to feeding the gas composition into the reactor. As such, heating of the pre-cured coating layer may start during or after establishment of the inert environment. The polymeric composition can be applied to the surface of the component at T1 and the pre-cured coating layer can be heated to T2 to facilitate formation of the protective layer. Both T1 and T2 are as described above.

In another embodiment, the preformed protective layer of the surface of the component in the reactor is repaired. The composition comprises the polycarbosilane, the polysilazane, or a combination thereof. The surface comprises the base layer comprising graphite, carbon fiber reinforced carbon (CFRC), or a combination thereof. The preformed protective layer is disposed on the base layer. The preformed protective layer defines at least one cavity (or defect). The preformed protective layer comprises silicon carbide, silicon nitride, or a combination thereof. The composition is applied to the preformed protective layer such that the cavity is at least partially filled with the pre-cured coating layer. The gas composition is fed into the reactor thereby heating the pre-cured coating layer to form the heterogeneous protective layer. The gas composition comprises trichlorosilane, silicon tetrachloride, or a combination thereof. The gas composition may also comprise $H_2$. The inert environment may be established in the reactor prior to feeding the gas composition into the reactor. As such, heating of the pre-cured coating layer may start during or after establishment of the inert environment. The polymeric composition can be applied to the preformed protective layer at T1 and the pre-cured coating layer can be heated to T2 to facilitate formation of the protective layer. Both T1 and T2 are as described above.

In another embodiment, chlorosilane is hydrogenated in the reactor via a hydrogenation process. The reactor has the component disposed therein. The component has the surface comprising carbon. The surface comes into contact with a corrosive agent present within the reactor. Prior to the hydrogenation process, the composition is applied to the surface to form the pre-cured coating layer. The composition comprises the polycarbosilane, the polysilazane, or a combination thereof. Afterwards, $H_2$ and chlorosilane are fed into the reactor. Hydrogenated chlorosilane and the corrosive agent forms from reaction of the $H_2$ and the chlorosilane. The heterogeneous protective layer is formed in situ on the surface of the component from the pre-cured coating layer. The heterogeneous protective layer is useful for protecting the surface from the corrosive agent, e.g. HCl. The chlorosilane can comprise silicon tetrachloride. The hydrogenated chlorosilane can comprise trichlorosilane.

In another embodiment, polycrystalline silicon is produced in the reactor. The reactor has the component disposed therein. The polycrystalline silicon comprises the reaction product of a chlorosilane and $H_2$. The component has the surface comprising carbon. The surface comes into contact with a corrosive agent present within the reactor. Prior to production of the polycrystalline silicon, the composition is applied to the surface of the component to form the pre-cured coating layer. The polymeric composition comprises the polycarbosilane, the polysilazane, or a combination thereof. Afterwards, $H_2$ and chlorosilane are fed into the reactor. Polycrystalline silicon and the corrosive agent forms from reaction of the $H_2$ and the chlorosilane. The heterogeneous protective layer is formed in situ on the surface of the component from the pre-cured coating layer. The heterogeneous protective layer is useful for protecting the surface from the corrosive agent, e.g. HCl. The chlorosilane can comprise trichlorosilane. The reactor can be a FBR.

In another embodiment, a new (or replacement) article is formed within the reactor via use of the composition. The article can be formed in addition or alternate to the protective layer(s) formed in the reactor, as described above. In this embodiment, the composition is applied or used in such a way as to form the article, such as a rivet, bolt head, plug, brace, etc. For example, if a rivet, bolt, or the like is damaged or missing, the composition can be used to take its place. Various three-dimensional articles can be made with the composition, rather than just a protective layer or the specific examples of articles described above. In this embodiment, the composition is typically in the form of a paste or slurry, such that the composition is self-supporting until such time that the composition reaches a final cure/densified state. This is not to say that such physical forms of the composition are a requirement, as a mold, form, or other supplemental structure may be used to hold/retain the composition in the desired shape until the composition suffi-ciently cures/densifies. In this way, the composition can be made into any desired pre-cured shape and then cured/densified in the reactor to form the article. The composition can be heated in the reactor as described above to facilitate formation of the article. More specific aspects of these various embodiments are as described and exemplified above.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A method of forming a heterogeneous protective layer on a surface of a component of a reactor with the heterogeneous protective layer comprising silicon, said method comprising the steps of:
    providing a polymeric composition for forming the heterogeneous protective layer;
    providing the component with the surface of the component comprising carbon;
    applying the polymeric composition on the surface of the component to form a pre-cured coating layer; and
    heating the pre-cured coating layer to form the heterogeneous protective layer;
    wherein the surface of the component is present within the reactor during heating of the pre-cured coating layer.

2. The method of claim 1 wherein the surface of the component is also present within the reactor during application of the polymeric composition.

3. The method of claim 1, wherein the pre-cured coating layer is heated by feeding a gas composition into the reactor.

4. The method of claim 3 wherein the gas composition:
    i) comprises trichlorosilane, silicon tetrachloride, or a combination thereof, and, optionally
    ii) further comprises hydrogen.

5. The method of claim 1, wherein the polymeric composition comprises a polycarbosilane.

6. The method of claim 5 wherein the:
    i) polycarbosilane is allylhydridopolycarbosilane; and/or
    ii) heterogeneous protective layer comprises silicon carbide.

7. The method of claim 1, wherein the polymeric composition comprises a polysilazane.

8. The method of claim 7 wherein the:
    i) polysilazane is perhydropolysilazane; and/or
    ii) heterogeneous protective layer comprises silicon nitride.

9. The method of claim 5, wherein the polymeric composition further comprises a filler for further forming the heterogeneous protective layer.

10. The method of claim 9 wherein the filler:
    i) comprises silicon carbide, silicon nitride, or a combination thereof; and/or
    ii) is present in the polymeric composition in an amount of from about 1 to about 80 parts by weight based on 100 parts by weight of the polymeric composition.

11. The method of claim 1, wherein:
    i) the polymeric composition is applied to the surface of the component at a first temperature (T1) and the pre-cured coating layer is heated to a second temperature (T2) which is greater than T1; and, optionally
    ii) T2 is of from about 100° C. to about 1750° C.

12. The method of claim 1, wherein the surface of the component comprises:
    i) graphite; and/or
    ii) carbon fiber reinforced carbon (CFRC).

13. The method of claim 1, wherein the surface of the component comprises a base layer and a preformed protective layer disposed over the base layer with the base layer comprising carbon and the preformed protective layer comprising silicon.

14. The method of claim 13 wherein the:
    i) preformed protective layer of the surface of the component defines at least one cavity and wherein the polymeric composition is applied such that the at least one cavity of the preformed protective layer is at least partially filled with the heterogeneous protective layer;
    ii) preformed protective layer of the surface of the component comprises silicon carbide, silicon nitride, or a combination thereof; and/or
    iii) base layer of the surface of the component comprises graphite, carbon fiber reinforced carbon (CFRC), or a combination thereof.

15. The method of claim 1, further comprising the step of establishing an inert environment in the reactor prior to heating of the pre-cured coating layer.

16. The method of claim 1, wherein the polymeric composition is applied to the surface of the component by spraying, brushing, knifing, pouring, rolling, dipping, smearing, rubbing, wiping, or combinations thereof.

17. The method of claim 1, wherein the component in the reactor is an interchanger, a separator, a heater, a chamber surface, or combinations thereof.

18. The method of claim 1, wherein a first polymeric composition is applied to the surface of the component to form a first pre-cured layer and a second polymeric composition different from the first polymeric composition is applied to the first pre-cured layer to form a second pre-cured layer and wherein both of the first and second pre-cured layers are heated to form the heterogeneous protective layer.

19. The method of claim 1, wherein the heterogeneous protective layer has an average thickness:
    i) greater than about 0.1 mils; or
    ii) of from about 0.1 to about 10 mils.

20. The method of claim 1, wherein the reactor is for production of:
    i) polycrystalline silicon, with the polycrystalline silicon comprising the reaction product of trichlorosilane and hydrogen gas; or
    ii) trichlorosilane, with the trichlorosilane comprising the reaction product of silicon tetrachloride and hydrogen gas.

* * * * *